United States Patent [19]

Muhr et al.

[11] 4,407,614
[45] Oct. 4, 1983

[54] APPARATUS FOR PERFORATING A WORKPIECE

[75] Inventors: Richard Muhr; Karl Schink, both of Attendorn, Fed. Rep. of Germany

[73] Assignee: Muhr und Bender, Attendorn, Fed. Rep. of Germany

[21] Appl. No.: 223,837

[22] Filed: Jan. 9, 1981

Related U.S. Application Data

[63] Continuation-in-part of Ser. No. 971,418, Dec. 20, 1978, abandoned.

[30] Foreign Application Priority Data

Dec. 30, 1977 [DE] Fed. Rep. of Germany ....... 2759083

[51] Int. Cl.³ .................. B23B 39/08; B23B 49/00
[52] U.S. Cl. .................................. 408/13; 408/12; 408/53; 83/368; 83/370
[58] Field of Search ............... 83/368, 370, 560; 408/12, 13, 53

[56] References Cited

U.S. PATENT DOCUMENTS

| | | | |
|---|---|---|---|
| 3,785,235 | 1/1974 | Peddinghaus et al. | 83/368 X |
| 3,803,961 | 4/1974 | Valente | 83/368 |
| 3,817,135 | 6/1974 | Valente | 83/368 |
| 3,892,154 | 7/1975 | Duffy | 83/368 |
| 3,919,071 | 11/1975 | Kindgren | 83/368 |
| 4,040,320 | 8/1977 | Cloud | 83/368 X |
| 4,061,064 | 12/1977 | Kindgren et al. | 408/13 X |
| 4,268,195 | 5/1981 | Regenbrecht | 83/368 |

*Primary Examiner*—Donald R. Schran
*Attorney, Agent, or Firm*—Karl F. Ross

[57] ABSTRACT

A workpiece such as a steel profile to be perforated at predetermined distances from a longitudinal reference surface thereof is moved past a plurality of perforating tools, such as punching or drill presses, mounted on a main slide and associated with respective sensors carried on an ancillary slide, the two slides being provided with a rack-and-pinion coupling working into a position detector. Each sensor comprises two sensing heads movable, upon selective activation prior to operation of the corresponding tool, transversely to the workpiece path with a slight relative offset; the ancillary slide is displaced until the reference surface is detected by one—but not both—sensing heads whereupon a corrective motion is imparted to the main slide under the control of the position detector.

5 Claims, 4 Drawing Figures

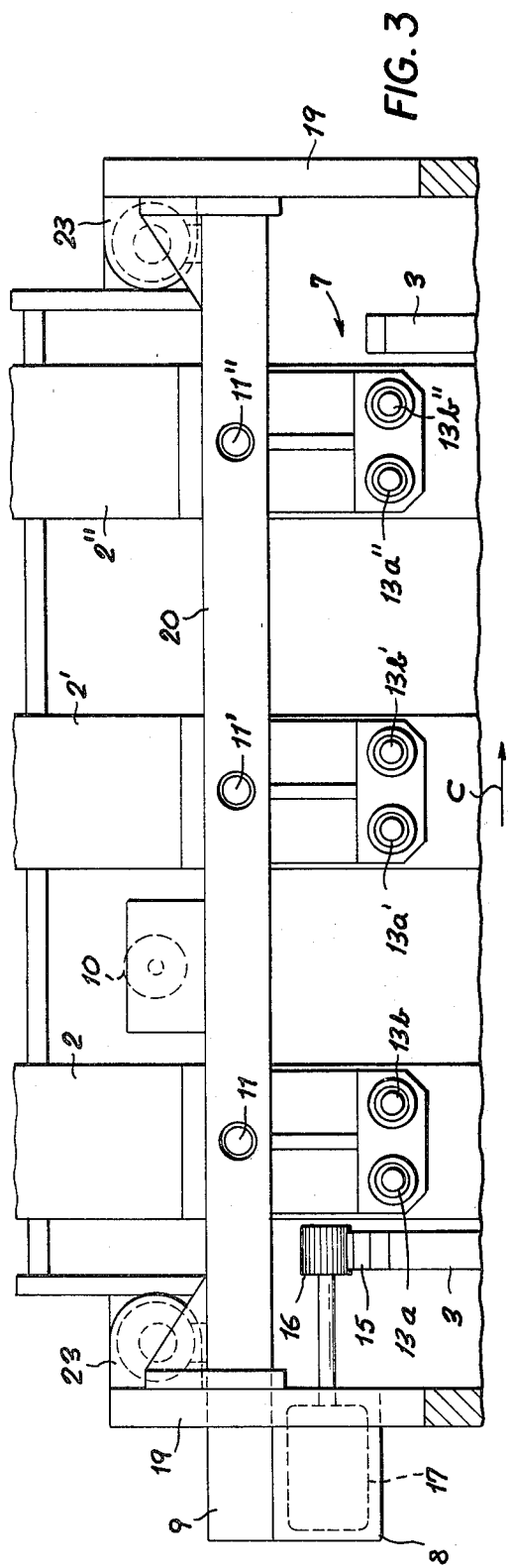
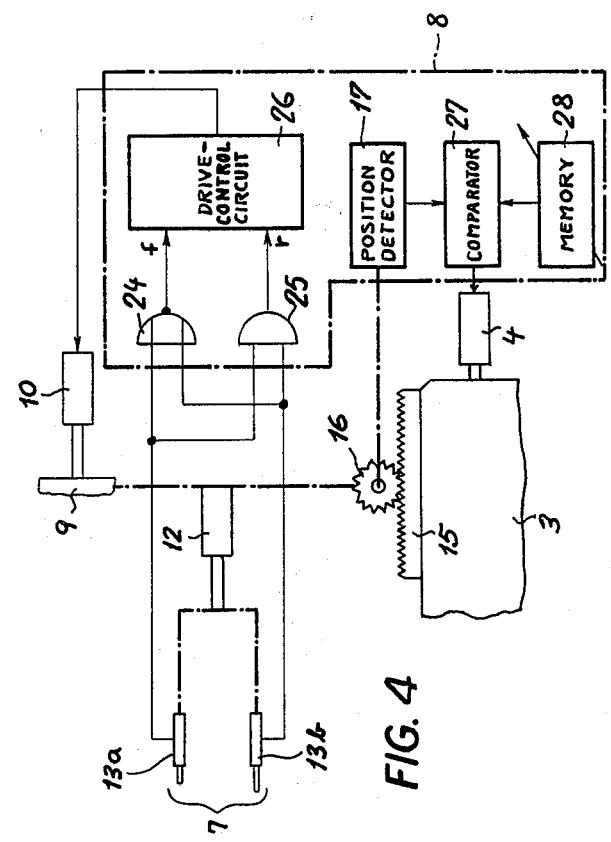

APPARATUS FOR PERFORATING A WORKPIECE

CROSS REFERENCE TO RELATED APPLICATION

This is a continuation-in-part of our copending application Ser. No. 971,418 filed Dec. 20, 1978 and now abandoned.

FIELD OF THE INVENTION

Our present invention relates to an apparatus for perforating an elongate workpiece, such as a steel profile, at a plurality of longitudinally separated locations.

BACKGROUND OF THE INVENTION

For the perforation of such workpieces by punching or drilling, at locations separated by selected distances from a reference surface such as the edge of a web or flange, it is known to transport the workpiece along a predetermined conveyor path and to sense the position of the reference surface for the purpose of properly disposing the perforating tool before actuating same.

Conventional sensing and positioning equipment used for this purpose is relatively complex and, in many instances, somewhat sluggish in its response to changing distances so as to limit the speed with which the workpiece can be moved through the apparatus. Typical prior-art devices of the type referred to utilize a single yieldable feeler (see, for example, U.S. Pat. No. 3,785,235), or a pair of such feelers (German open application No. 2,334,438) at least one of which must report contact with solid material to enable the operation of a perforator.

OBJECTS OF THE INVENTION

Thus, the general object of our present invention is to provide an improved apparatus of this character which obviates the aforestated drawbacks.

A more particular object use is to provide means in such an apparatus for maintaining a close tolerance range within which a perforation is to be located.

SUMMARY OF THE INVENTION

We realize these objects, in accordance with our present invention, by the provision of two slides displaceable by mutually independent drive means in a direction transverse to the transport path of the workpiece to be perforated, namely a main slide carrying tool means for perforating the workpiece and an ancillary slide adjacent the main slide carrying sensing means for detecting a reference edge of the workpiece, the sensing means including a pair of closely juxtaposed elements which are relatively offset in a direction transverse to that path. The two sensing elements control switch means for operating the drive means of the ancillary slide to advance same toward the transport path in the absence of a detection signal from both of these elements and to retract the ancillary slide in the presence of detection signals from both sensing elements; with the aid of correlating means determining the relative displacement of the two slides and controlling the drive means of the main slide, the latter is then restored to a predetermined position relative to the immobilized ancillary slide which conforms to the requisite distance of the next perforation—within the tolerance limits established by the mutual offset of the two sensing elements—from the reference surface.

According to a more particular feature of our invention, the sensing elements are a pair of spring-biased heads on a support movable relatively to the ancillary slide, that support being provided with further drive means actuatable (e.g. manually) to advance same from an inoperative position into an operative position on the ancillary slide upon a prepositioning of the main slide with the tool means confronting the workpiece.

BRIEF DESCRIPTION OF THE DRAWINGS

The above and other features of our invention will now be described in detail with reference to the accompanying drawing in which:

FIG. 3 is a fragmentary front view as seen in the direction III of FIG. 1; and

FIG. 4 is a diagram of a control system for the apparatus of FIGS. 1-3.

SPECIFIC DESCRIPTION

Figure 1:
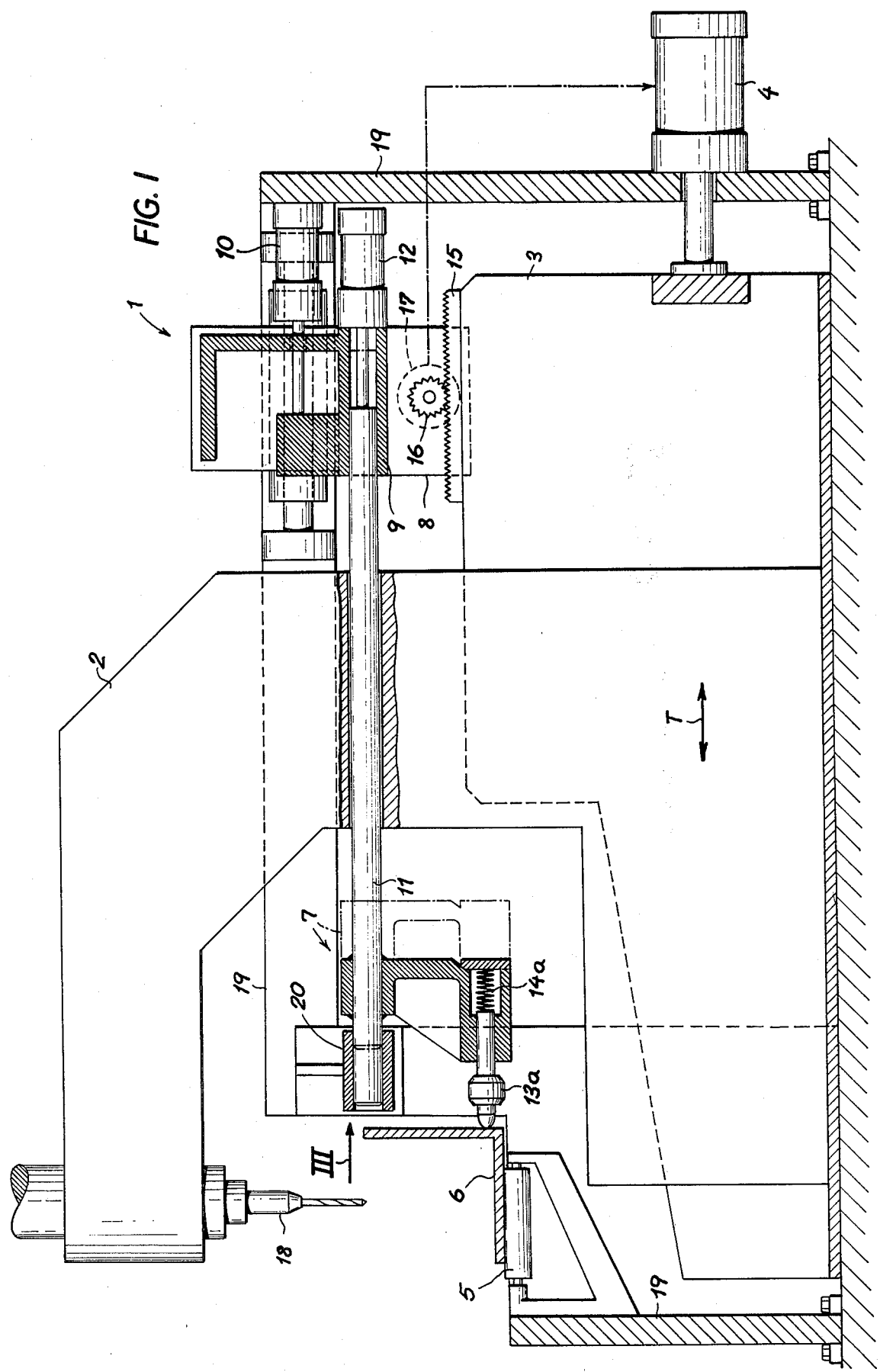
FIG. 1 is a side-elevational view, partly in section, of an apparatus embodying our invention.
Figure 2:
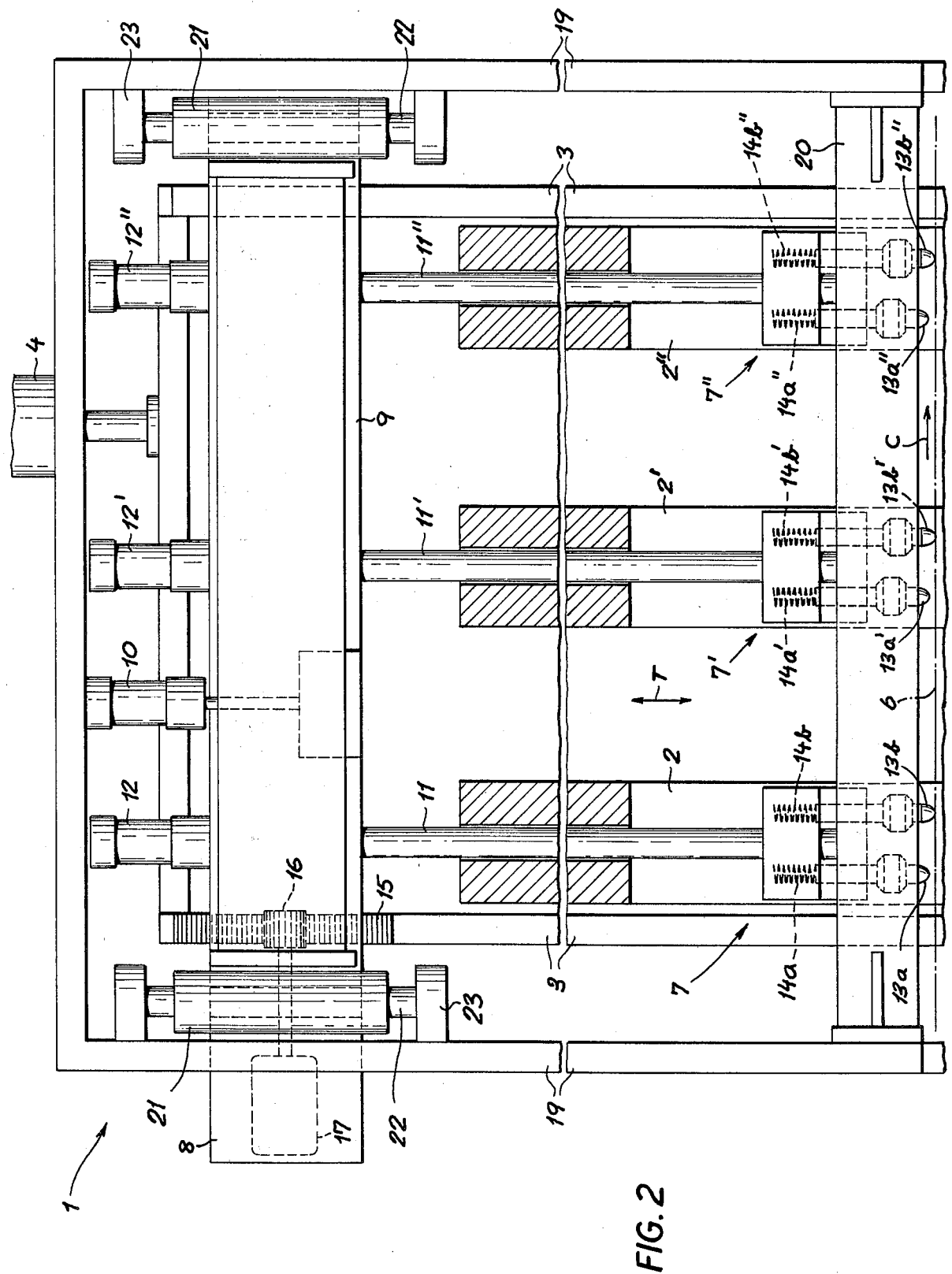
FIG. 2 is a top view of the assembly of FIG. 1 with parts broken away.

In FIGS. 1 and 2 we have shown an apparatus 1 with a machine frame 19 on which a conveyor 5 (FIG. 1) transports an elongate workpiece 6, specifically an L-profile, in its longitudinal direction along a path schematically represented by an arrow C in FIGS. 2 and 3. A main slide 3 is shiftable in a transverse direction T by first drive means 4, such as a double-acting hydraulic cylinder, toward and away from conveyor 5. An ancillary slide 9 is independently reciprocable in the same direction T by second drive means 10, also shown as a double-acting cylinder, and is provided for this purpose with a pair of end sleeves 21 traversed by rods 22 which are mounted on frame 19 with the aid of lugs 23; see also FIG. 3.

Slide 3 carries three tool supports 2, 2', 2" which are spaced apart in the transport direction C and are provided with respective perforating tools 18 here shown as drill chucks. In the position illustrated in FIG. 1 the axes of these tools pass about midway through the horizontal flange of profile 6, at locations between the rollers forming part of conveyor 5. Instead of drills we may also use punches, provided that the workpiece 6 is underlain by fixed supports in line with these punches.

Slide 9 carries three hydraulic cylinders 12, 12', 12" having pistons extended by rods 11, 11', 11" whose free ends are guided in a fixed beam 20 and carry respective position sensors 7, 7', 7", each sensor comprising a pair of sensing heads 13a, 13a', 13a" and 3b, 13b' 13b" biased forwardly, i.e. toward the path of workpiece 6, by coil springs 14a, 14a', 14a" and 14b, 14b', 14b". As will be apparent from FIG. 2, heads 13b etc. are forwardly off-set from the associated heads 13a etc. by a small distance in the transverse direction T. Rods 11, 11', 11" pass with clearance through the associated tool carriers 2, 2', 2" and are thus movable by their drive cylinders 12, 12', 12" independently of slides 3 with freedom of limited displacement relative to slide 9. The latter slide carries a controller 8 incorporating a motion detector 17 to which the relative position of slides 3 and 9 is reported by a pinion 16 on slide 9 meshing with a rack 15 on slide 3. Controller 8 serves to correlate, in a manner more fully described hereinafter with reference to FIG. 4, the position of slide 3 with that of slide 9.

As particularly illustrated in FIG. 4 for the position sensor 7, the two heads 13a and 13b have outputs connected in parallel to a NOR gate 24 and an AND gate 25 working into respective inputs f and r of a drive-control circuit 26 included in controller 8. Normally all three sensors 7, 7', 7" are withdrawn by their cylinders 12, 12', 12" into an inoperative position relative to slide 9, as indicated in phantom lines in FIG. 1. When, for example, the tool 18 of carrier 2 has to be activated, the operator manually actuates the associated cylinder 12 to advance the sensing heads 13a, 13b into an operative position in which they may or may not contact the workpiece 6, depending on the initial position of slide 9 correlated by the controller 8 with the starting position of slide 3. If, in this operating position, neither sensor 13a, 13b contacts the workpiece 6, no detection signals appear at their outputs so that NOR gate 24 energizes the input f whereupon circuit 26 causes cylinder 10 to drive the slide 9 forward. This motion stops as soon as the leading head 13b contacts the workpiece so as to cut off the gate 24. At that point, position detector 17 registers a numerical value which is fed to a comparator 27 receiving a preselected reference value from a memory 28 in the controller. This reference value indicates a normal relative position of the two slides and thus determines the position which the main slide 3 must occupy when the ancillary slide 9 has approached the workpiece 6 to within the tolerance range established by the relative offset of the operatively positioned sensing heads 13a and 13b. Thus, comparator 27 causes the pressurization of cylinder 4 in one direction or the other, depending on the sign of the difference between the numerical values received from components 17 and 28, to displace the slide 3 until this difference is zero while slide 9 is held stationary by identical pressurization of cylinder 10 from opposite ends.

If, on the other hand, slide 3 initially lies too close to the path of the workpiece, both sensing heads 13a and 13b will make contact and emit detection signals when—with slides 3 and 9 immobilized—the cylinder 12 is pressurized for operatively positioning the sensor 7 on slide 9. In this case there will be conduction of AND gate 25 so that control circuit 26 actuates the cylinder 10 in reverse and retracts the slide 9 until the less advanced head 13a is disengaged from the workpiece. At this point, as before, comparator 27 responds to the difference between the preset value stored in memory 28 and the reading of position detector 17 to realign the slide 7 with the slide 9, thereby placing the tool 18 at the proper distance from the reference surface engaged by head 13b.

If on the next activation of tool 18 the workpiece 6 has maintained its previous distance from the beam 20 and thus from the two slides 3 and 9 (assuming that they were not moved in the interim), sensors 13a and 13b will keep both gates 24 and 25 cut off so that no corrective actuation of cylinders 10 and 4 will be needed. The same will be true if the operator has previously withdrawn the sensor 7 into its inoperative position, e.g. for the purpose of activating one of the other sensors 7', 7" together with the associated tools, and if the procedure did not require any repositioning of the slides. Memory 28 may have three separate stages for storing respective reference values for the tools of carriers 2, 2', 2", with switchover to the corresponding stage upon selective actuation of cylinder 12, 12' or 12" for the operative positioning of the associated sensor 7, 7' or 7". In any event the distance between the reference surface of workpiece 6 and the perforations to be formed therein can be readily modified by changing the numerical value or values stored in memory 28.

Though the heads 13a, 13b etc. have been illustrated as contactors, we could also employ contactless sensors of the electromagnetic or photoelectric type overlying for example the upper edge of the vertical web of profile 6. In such a case the relative offset between these sensing heads might be obtained by the use of, say, slightly different angles for two light beams trained upon the web edge from two closely juxtaposed sources which could be equidistant from the workpiece path. With or without actual contact, the sensing elements emit their aforementioned detection signals in predetermined approach positions relative to a reference surface of the confronted workpiece.

We claim:

1. An apparatus for perforating an elongate workpiece, comprising:
   conveyor means for longitudinally transporting said workpiece along a predetermined path;
   a main slide carrying tool means for perforating a workpiece confronted thereby;
   an ancillary slide adjacent said main slide carrying sensing means for detecting a reference surface of said workpiece, said sensing means including a pair of closely juxtaposed elements relatively offset in a direction transverse to said path, each of said elements having an output emitting a detection signal in a predetermined approach position relative to said reference surface;
   mutually independent first and second drive means for respectively displacing said main and ancillary slides in said transverse direction;
   switch means connected to the outputs of said elements for operating said second drive means to advance said ancillary slide toward said path in the absence of a detection signal from both of said elements and to retract said ancillary slide in the presence of detection signals from both said elements; and
   correlating means for determining a relative displacement of said slides and controlling said first drive means to restore said main slide to a predetermined position relative to said ancillary slide while holding the latter stationary by immobilizing said second drive means.

2. An apparatus as defined in claim 1 wherein said correlating means comprises a rack-and-pinion coupling between said slides and a position detector driven by the pinion of said coupling.

3. An apparatus as defined in claim 1 wherein said elements are a pair of spring-biased heads adapted to yield upon contact with said workpiece.

4. An apparatus as defined in claim 1, 2 or 3 wherein said sensing means further includes a support for said elements movable relatively to said ancillary slide and third drive means actuatable to advance said support from an inoperative position into an operative position on said ancillary slide upon a prepositioning of said main slide with said tool means confronting said workpiece.

5. An apparatus as defined in claim 4 wherein said tool means comprises a plurality of perforating tools spaced apart in the direction of said path, said sensing means including a respective pair of juxtaposed elements for each of said tools, said support means being selectively operable to move any pair of elements into the operative position thereof preparatorily to actuation of the corresponding tool.

* * * * *